US009056737B2

(12) United States Patent
Takahashi

(10) Patent No.: US 9,056,737 B2
(45) Date of Patent: Jun. 16, 2015

(54) IMAGE FORMING APPARATUS, IMAGE FORMING METHOD, AND STORAGE MEDIUM

(75) Inventor: Minoru Takahashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 508 days.

(21) Appl. No.: 13/005,576

(22) Filed: Jan. 13, 2011

(65) Prior Publication Data

US 2011/0175281 A1 Jul. 21, 2011

(30) Foreign Application Priority Data

Jan. 19, 2010 (JP) ................................ 2010-009382
Dec. 8, 2010 (JP) ................................ 2010-273254

(51) Int. Cl.

| | |
|---|---|
| ***G06F 7/66*** | (2006.01) |
| ***G05B 19/29*** | (2006.01) |
| ***B65H 7/02*** | (2006.01) |
| ***B65H 5/34*** | (2006.01) |
| ***G03G 15/00*** | (2006.01) |
| *G03G 15/23* | (2006.01) |

(52) U.S. Cl.

CPC .............. *B65H 5/34* (2013.01); *B65H 2511/20* (2013.01); *B65H 2513/10* (2013.01); *B65H 2801/06* (2013.01); *G03G 15/6564* (2013.01); *G03G 2215/00599* (2013.01); *G03G 2215/00721* (2013.01); *G03G 2215/00746* (2013.01); *G03G 15/235* (2013.01); *G03G 15/6567* (2013.01)

(58) Field of Classification Search

CPC ............................ A61F 13/15772; B65H 5/34
USPC ............................ 700/124; 318/600; 271/265
See application file for complete search history.

(56) References Cited

U.S. PATENT DOCUMENTS

| | | | | |
|---|---|---|---|---|
| 6,014,542 | A | 1/2000 | Hozumi et al. | |
| 7,641,329 | B2 * | 1/2010 | Akiyama et al. | 347/104 |
| 8,269,435 | B2 * | 9/2012 | Watahiki | 318/163 |
| 2006/0022401 | A1 * | 2/2006 | Akiyama et al. | 271/265.01 |
| 2006/0024113 | A1 * | 2/2006 | Saito et al. | 400/578 |
| 2006/0088338 | A1 * | 4/2006 | Matsuda et al. | 399/167 |

(Continued)

FOREIGN PATENT DOCUMENTS

| | | |
|---|---|---|
| JP | H05-005109 | 1/1993 |
| JP | 2003-009564 | 1/2003 |

(Continued)

OTHER PUBLICATIONS

Japanese Office Action dated Sep. 2, 2014.

*Primary Examiner* — Mohammad Ali
*Assistant Examiner* — Ziaul Karim
(74) *Attorney, Agent, or Firm* — IPUSA, PLLC

(57) ABSTRACT

An apparatus for forming an image on a recording medium. The apparatus includes a conveying unit conveying the recording medium; a driving unit driving the conveying unit; a calculation unit calculating a correction value based on a position error of the recording medium with respect to the image; a detection unit detecting a current conveying speed of the recording medium being conveyed by the conveying unit; a position controller calculating a second target conveying speed based on the correction value, the current conveying speed, and a first target conveying speed of the conveying unit or a target position of the recording medium; and a speed controller controlling the driving unit based on the second target conveying speed, the current conveying speed, and the first target conveying speed.

16 Claims, 14 Drawing Sheets

(56) References Cited

U.S. PATENT DOCUMENTS

| | | | | |
|---|---|---|---|---|
| 2007/0007925 | A1* | 1/2007 | Yamane | 318/600 |
| 2007/0126837 | A1 | 6/2007 | Takahashi et al. | |
| 2009/0003854 | A1* | 1/2009 | Naoi et al. | 399/38 |
| 2009/0234498 | A1 | 9/2009 | Takahashi et al. | |
| 2010/0034565 | A1 | 2/2010 | Ashikawa et al. | |
| 2011/0081181 | A1* | 4/2011 | Saito | 399/395 |
| 2011/0199417 | A1* | 8/2011 | Naoi et al. | 347/16 |

FOREIGN PATENT DOCUMENTS

| | | |
|---|---|---|
| JP | 2006-071922 | 3/2006 |
| JP | 2007-147758 | 6/2007 |
| JP | 2007-206406 | 8/2007 |
| JP | 3978837 | 9/2007 |
| JP | 2008-281656 | 11/2008 |
| JP | 2009-128440 | 6/2009 |
| JP | 4280894 | 6/2009 |
| JP | 2010-217789 | 9/2010 |

* cited by examiner

IMAGE FORMING APPARATUS, IMAGE FORMING METHOD, AND STORAGE MEDIUM

BACKGROUND OF THE INVENTION

1. Field of the Invention

An aspect of this disclosure relates to an image forming apparatus, an image forming method, and a storage medium storing a program for causing a computer to perform the image forming method.

2. Description of the Related Art

In a typical electrophotographic image forming apparatus, an electrostatic latent image is formed using a laser beam on a photosensitive drum and the electrostatic latent image is developed with toner to form a toner image. The toner image is transferred onto paper and fused onto the paper by applying heat and pressure to form a stable image on the paper.

In the above process, misalignment between the paper and the formed image (or an error in the position of the formed image on the paper) may occur due to, for example, slippage between the paper and a paper conveying unit or slippage between sheets of paper. Japanese Patent No. 4280894, for example, discloses a technology for preventing the misalignment between paper and a formed image.

In a configuration disclosed in Japanese Patent No. 4280894, the leading edge of paper is detected with a sensor to determine paper-feed timing and a drive motor for driving a paper conveying unit is controlled based on the determined paper-feed timing such that transfer of a toner image from a photosensitive drum to the paper is started from a predetermined position on the paper.

With the configuration of Japanese Patent No. 4280894, it is necessary to prepare a target driving profile indicating timing and other parameters for driving the drive motor. FIG. 1 shows an exemplary target driving profile. In FIG. 1, the horizontal axis indicates time, the left vertical axis indicates a target speed, and the right vertical axis indicates a target position.

However, the timing difference between an image and paper (i.e., the difference in the feed timing of the image and the paper) differs from one image forming process to another, particularly when different types of paper are used. Also, in a high-quality image forming apparatus, it is necessary to correct the timing difference between the image and the paper at every transfer step. Therefore, in such a high-quality image forming apparatus, it is necessary to generate a target driving profile each time after the feed timing of the image and the paper is detected.

The target driving profile may be generated based on a look-up table. However, this approach makes it necessary to provide a large amount of memory for storing the look-up table and to increase the computing power of a processing unit to generate the target driving profile. This in turn increases the costs of an image forming apparatus.

SUMMARY OF THE INVENTION

In an aspect of this disclosure, there is provided an apparatus for forming an image on a recording medium. The apparatus includes a conveying unit conveying the recording medium; a driving unit driving the conveying unit; a calculation unit calculating correction value based on a position error of the recording medium with respect to the image; a detection unit detecting a current conveying speed of the recording medium being conveyed by the conveying unit; a position controller calculating a second target conveying speed based on the correction value, the current conveying speed, and a first target conveying speed of the conveying unit or a target position of the recording medium; and a speed controller controlling the driving unit based on the second target conveying speed, the current conveying speed, and the first target conveying speed.

DESCRIPTION OF THE PREFERRED EMBODIMENTS

Terminology

Before describing preferred embodiments of the present invention, terms used in the present application are described. In the present application, an image forming apparatus indicates, for example, a printer, a facsimile machine, a copier, a plotter, or a multifunction peripheral having functions of them. A recording medium indicates any medium on which an image can be formed and may be made of paper, thread, fabric, textile, leather, metal, plastic, glass, wood, ceramic, or so on. In the descriptions below, it is assumed that a recording medium is a sheet of paper. “Image forming” indicates not only a process of forming an image such as a character, a drawing, or a pattern on a recording medium, but also indicates just jetting liquid droplets (ink) onto a recording medium. An image carrier indicates, for example, a photosensitive drum. In the descriptions below, a photosensitive drum is used as the image carrier. An intermediate transfer unit indicates, for example, an intermediate transfer belt. In the descriptions below, it is assumed that the intermediate transfer unit is implemented by an endless belt. The letters Y, C, M, and K indicate yellow, cyan, magenta, and black, respectively. Throughout the accompanying drawings, the same reference number is assigned to components having the same function, and overlapping descriptions of those components are omitted.

<Outline of Image Forming Apparatus>

Figure 1:
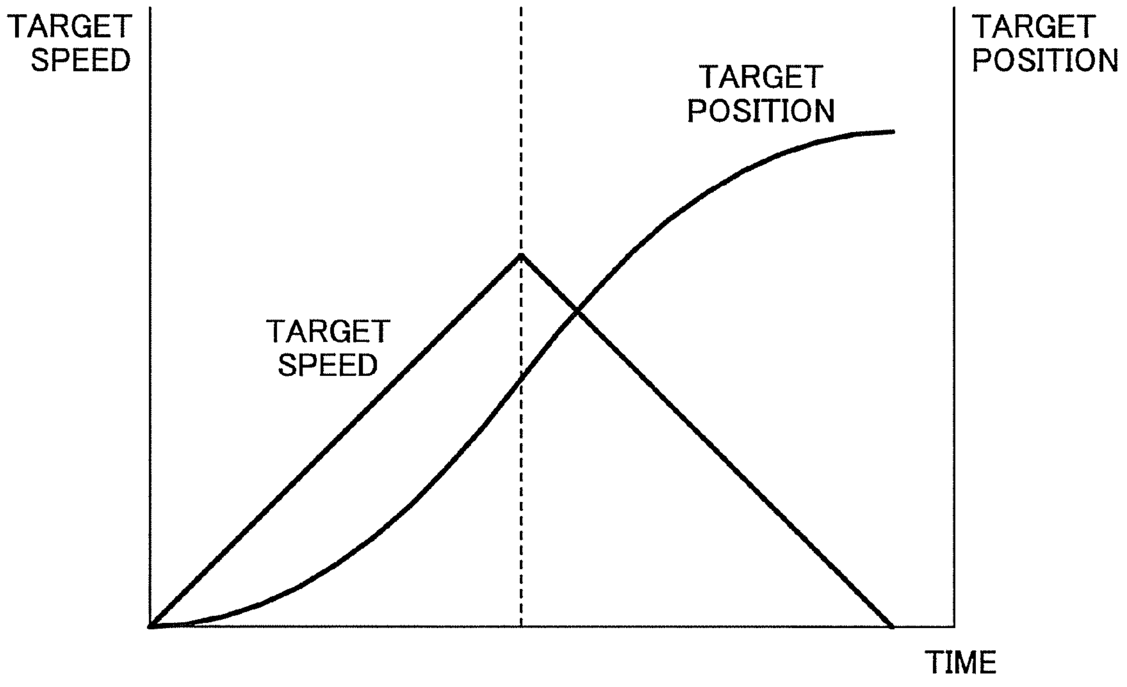
FIG. 1 is a graph showing an exemplary target driving profile.
Figure 2:
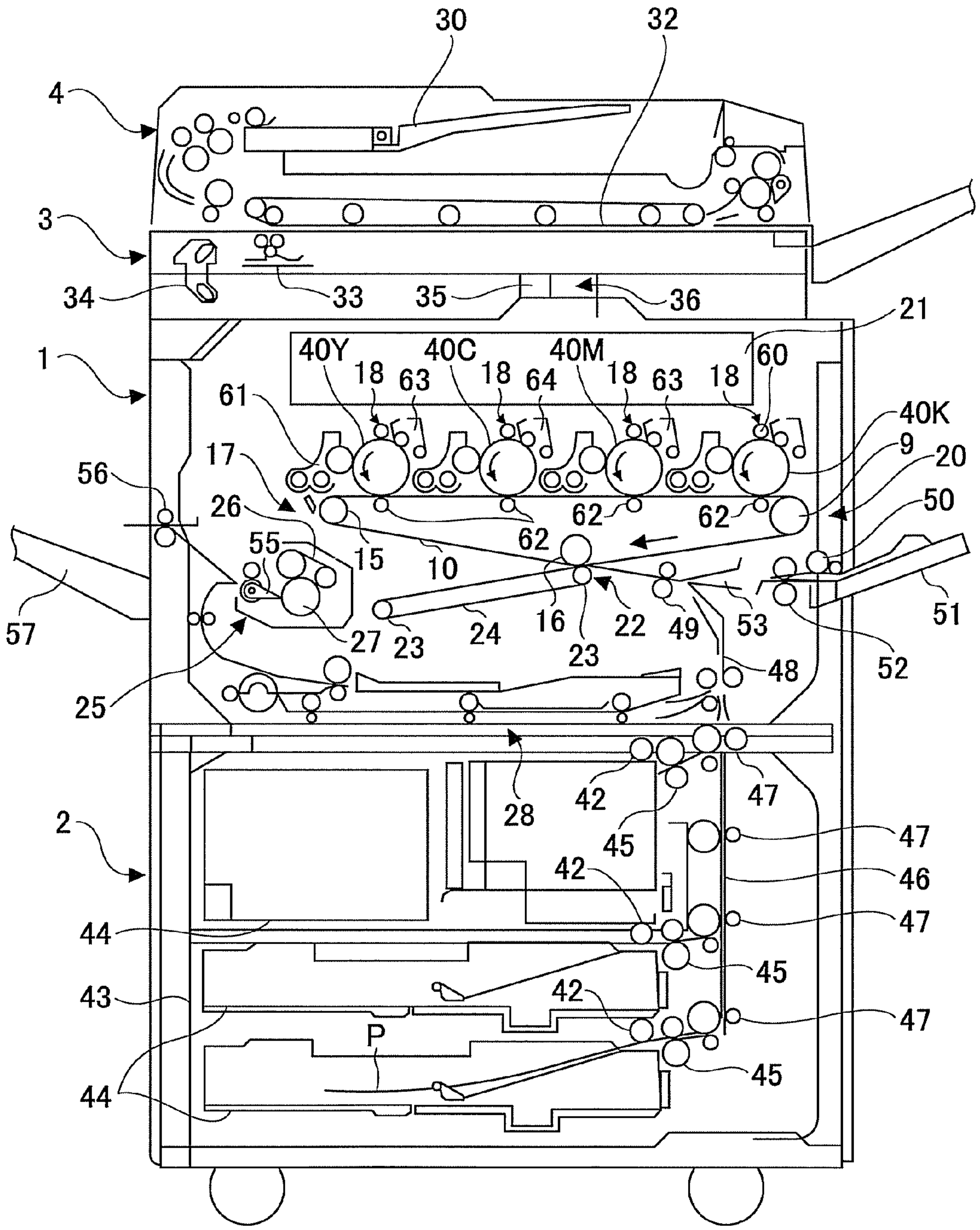
FIG. 2 is a schematic diagram of an image forming apparatus according to an embodiment of the present invention.
Figure 3:
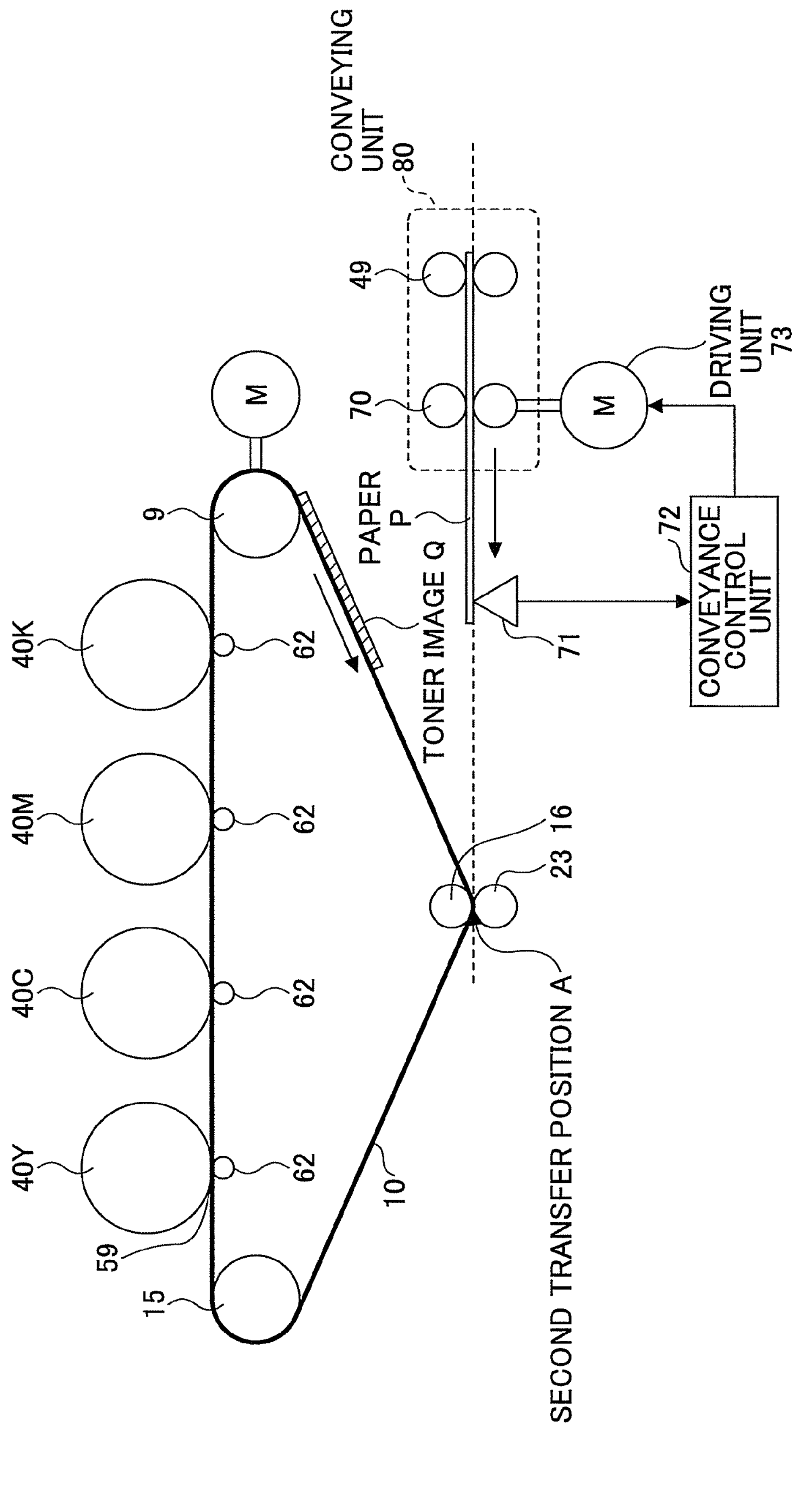
FIG. 3 is a drawing illustrating image forming units and a conveyance control unit according to an embodiment of the present invention.

FIG. 2 is a schematic diagram of an image forming apparatus according to an embodiment of the present invention. In this embodiment, the image forming apparatus is implemented as a tandem color image forming apparatus including four image forming units. However, the image forming apparatus may have any other appropriate configuration. FIG. 3 shows image carriers (photosensitive drums) 40Y, 40C, 40M, and 40K of the image forming units.

The image forming apparatus includes a paper-feed table 2, a main unit 1 mounted on the paper-feed table 2, a scanner 3 mounted on the main unit 1, and an automatic document feeder (ADF) 4 mounted on the scanner 3. The main unit 1 includes a primary transfer unit 20 disposed substantially in the center of the main unit 1 and including an intermediate transfer belt 10 implemented by an endless belt.

As shown in FIG. 3, the intermediate transfer belt 10 is stretched over a drive roller 9 and two driven rollers 15 and 16. The drive roller 9 is rotated by a drive unit such as a motor and the intermediate transfer belt 10 is rotated clockwise in FIG. 3 by the rotation of the drive roller 9.

A cleaning unit 17 is provided to the left of the driven roller 15 to remove toner remaining on the surface of the intermediate transfer belt 10 after image transfer. Photosensitive drums 40Y, 40C, 40M, and 40K (may be collectively called the photosensitive drums 40 when distinction is not necessary), which are image carriers corresponding to yellow (Y), cyan (C), magenta (M), and black (K), are arranged at predetermined intervals above a straight portion of the intermediate transfer belt 10 between the drive roller 9 and the driven roller 15 and along the rotational direction of the intermediate transfer belt 10. Four primary transfer rollers 62 are provided inside of the loop of the intermediate transfer belt 10 so as to face the corresponding photosensitive drums 40 via the intermediate transfer belt 10.

Each of the photosensitive drums 40 is rotatable counterclockwise in FIG. 2. A charging unit 60, a developing unit 61, the primary transfer roller 62, a photosensitive drum cleaning unit 63, and a discharging unit 64 are disposed around the photosensitive drum 40. Each set of these components and the photosensitive drum 40 constitutes an image forming unit 18. The position where the primary transfer roller 62 is pressed against the photosensitive drum 40 via the intermediate transfer belt 10 is called a primary transfer position 59.

A common exposing unit 21 is provided above the four imaging units 18. Toner images formed on the photosensitive drums 40 are sequentially transferred onto the intermediate transfer belt 10 at the corresponding primary transfer positions 59 and are thereby superposed on the intermediate transfer belt (the superposed toner image is hereafter called a toner image Q). In the descriptions below, a signal output by the exposing unit 21 when exposing the photosensitive drum 40 is called an image writing signal.

A secondary transfer unit 22 is provided below the intermediate transfer belt 10 to transfer the image Q from the intermediate transfer belt 10 to paper P (recording medium). The secondary transfer unit 22 includes two rollers 23 and an endless secondary transfer belt 24 stretched over the rollers 23. One of the rollers 23 is pressed against the driven roller 16 via the intermediate transfer belt 10 and the secondary transfer belt 24. Accordingly, the secondary transfer belt 24 is pressed against the intermediate transfer belt 10 at a secondary transfer position A shown in FIG. 3.

The paper P is conveyed into the secondary transfer position A between the secondary transfer belt 24 and the intermediate transfer belt 10 and the toner image Q is transferred from the intermediate transfer belt 10 onto the paper P. A fusing unit 25 for fusing the toner image Q onto the paper P is provided downstream of the secondary transfer unit 22 in the paper conveying direction. The fusing unit 25 includes a fusing belt 26 and a pressure roller 27 pressed against the fusing belt 26.

The secondary transfer unit 22 also has a function to convey the paper P after image transfer to the fusing unit 25. The secondary transfer unit 22 may instead be implemented by a transfer roller or a non-contact charger. A paper reversing unit 28 is provided below the secondary transfer unit 22. The paper reversing unit 28 turns the paper P upside down when images are to be formed on both sides of the paper P. Thus, the main unit 1 is implemented as a tandem color image forming unit employing an indirect (intermediate) transfer method.

To make a color copy of a document with the image forming apparatus configured as described above, the document is placed on a document table 30 of the automatic document feeder 4. Alternatively, the document may be manually placed on a contact glass 32 of the scanner 3 by opening and closing the automatic document feeder 4.

When the document is placed on the document table 30 of the automatic document feeder 4 and a start key (not shown) is pressed, the document is automatically placed on the contact glass 32. Meanwhile, when the document is manually placed on the contact glass 32 and the start key is pressed, the scanner 3 is immediately driven and a first moving unit 33 and a second moving unit 34 start moving. The document is illuminated with a light beam emitted from a light source of the first moving unit 33. Reflected light from the document surface is reflected by mirrors of the second moving unit 34, passes through an imaging lens 35, and enters an image sensor 36 where the entered light is converted into an image signal.

Also when the start key is pressed, the intermediate transfer belt 10 starts to rotate. At the same time, the photosensitive drums 40Y, 40C, 40M, and 40K start rotating and single-color toner images of yellow, cyan, magenta, and black are formed on the corresponding photosensitive drums 40Y, 40C, 40M, and 40K. The single-color toner images are transferred sequentially from the photosensitive drums 40Y, 40C, 40M, and 40K onto the intermediate transfer belt 10 rotating clockwise in FIG. 2 and are thereby superposed on the intermediate transfer belt 10. As a result, a multicolor toner image (toner image Q) is formed on the intermediate transfer belt 10.

Also when the start key is pressed, a paper-feed roller 42 starts to rotate and feeds the paper P from one of paper-feed cassettes 44 of a paper bank 43 of the paper-feed table 2. The paper P is separated by separating rollers 45 into separate sheets and the sheets of the paper P are fed one by one into a paper conveying path 46. The paper P (each sheet) is conveyed further by conveying rollers 47 into a paper conveying path 48 in the main unit 1 and is temporarily stopped at resist rollers 49.

Alternatively, the paper P may be fed from a manual-feed tray 51. The paper P placed on the manual-feed tray 51 is fed by a paper-feed roller 50 and separated by separating rollers 52 into separate sheets. Then, the paper P (each sheet) is fed into a manual-feed path 53 and temporarily stopped at the resist rollers 49. The resist rollers 49 are started to rotate in synchronization with the movement of the multicolor toner image Q on the intermediate transfer belt 10 to convey the paper P into a gap (the secondary transfer position A) between the intermediate transfer belt 10 and the secondary transfer unit 22. As a result, the multicolor toner image Q is transferred onto the paper P. A stopper may be used instead of the resist rollers 49 to temporarily stop the paper P.

The paper P with the multicolor toner image Q is conveyed by the secondary transfer unit 22 to the fusing unit 25. The fusing unit 25 fuses the multicolor toner image Q onto the paper P with heat and pressure. Thereafter, the paper P is guided by a switching claw 55 and ejected by ejection rollers 56 onto a paper-catch tray 57. Meanwhile, in a duplex mode, the paper P with an image on one side is guided by the switching claw 55 to the paper reversing unit 28. The paper reversing unit 28 turns the paper P upside down and conveys the paper P to the secondary transfer position A again. Then, an image is formed on the other side of the paper P and the paper P is ejected by the ejection rollers 56 onto the paper-catch tray 57.

As shown in FIG. 3, the paper P fed from the paper-feed cassette 44 is conveyed to the secondary transfer position A by a conveying unit 80. In this example, the resist rollers 49 and a pair of drive rollers 70 constitute the conveying unit 80. The drive rollers 70 are rotated by a driving unit 73 (e.g., a motor) to convey the paper P to the secondary transfer position A.

The driving unit 73 is controlled by a conveyance control unit 72 that is connected to a paper detection unit 71 for detecting a predetermined part (e.g., the leading edge) of the paper P.

The conveyance control unit 72 makes it possible to correct a position error (or a timing error) of the paper P (recording medium) with respect to the toner image Q on the intermediate transfer belt 10 at the secondary transfer position A of the secondary transfer unit 22.

Exemplary functional configurations of the conveyance control unit 72 are described below.

First Embodiment

Figure 4:
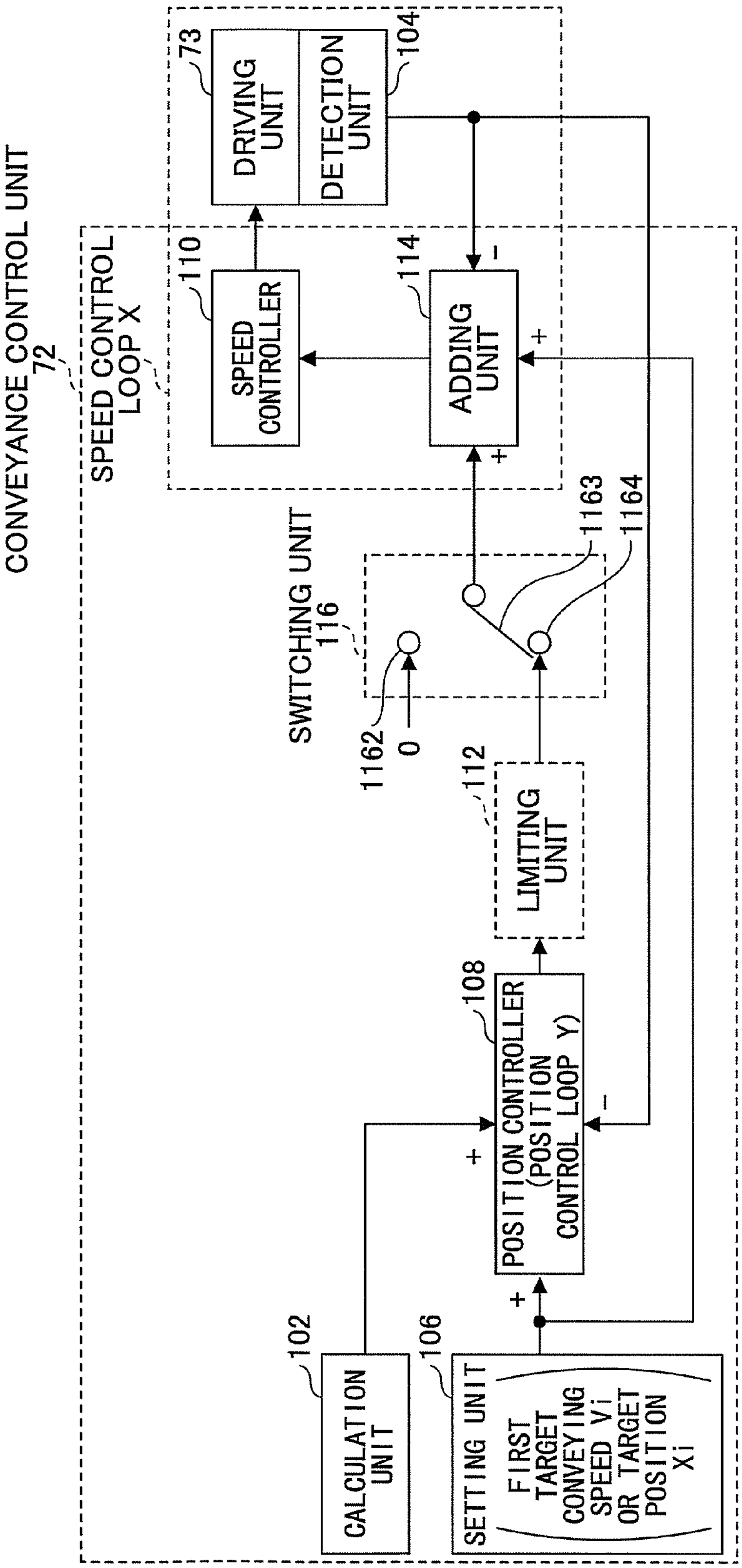
FIG. 4 is a block diagram illustrating a functional configuration of a conveyance control unit according to an embodiment of the present invention.

FIG. 4 is a block diagram illustrating a functional configuration of the conveyance control unit 72 according to a first embodiment of the present invention. As shown in FIG. 4, the conveyance control unit 72 of this embodiment includes a calculation unit 102, a setting unit 106, a position controller 108, an adding unit 114, and a speed controller 110.

The calculation unit 102 calculates a correction value (or the amount of correction) for correcting a position error (or a timing error) of the paper P with respect to the toner image Q. The correction value may indicate a value obtained based on a position error of the paper P with respect to the toner image Q on the intermediate transfer belt 10 or may indicate the position error itself. In the former case, the correction value may be obtained by performing a predetermined operation on the position error. The predetermined operation is determined, for example, based on the type of paper and the temperature characteristics of rollers. An exemplary method of calculating the correction value is described below. As described above, the paper detection unit 71 detects a predetermined part of the paper P and outputs a paper detection signal to the calculation unit 102. The correction value is calculated based on the image writing signal, which is output by the exposing unit 21 when exposing the photosensitive drum 40, and the paper detection signal. In the descriptions below, it is assumed that the paper detection unit 71 outputs the paper detection signal when the leading edge of the paper P is detected.

After the leading edge of the paper P is brought into contact with the resist rollers 49 or a stopper such as a resist gate, the resist rollers 49 are rotated or the stopper is opened at a predetermined timing to restart the conveyance of the paper P. This timing is determined based, for example, on the timing when formation of an electrostatic latent image on the photosensitive drum 40 is started (i.e., when the image writing signal is output).

Thus, after reaching the resist rollers 49, the paper P is conveyed further by the resist rollers 49 and the drive rollers 70 to the secondary transfer position A between the driven roller 16 and one of the rollers 23 of the secondary transfer unit 22. A current (actual) conveying speed Vr at which the paper P is conveyed by the conveying unit 80 is set at a value that is substantially the same as a surface speed Vb of the intermediate transfer belt 10.

The paper detection unit 71 is disposed between the resist rollers 49 and the secondary transfer position A of the secondary transfer unit 22. The calculation unit 102 calculates a correction value $\Delta X$ (may be called a sub-scanning resist correction value) for correcting a position error of the paper P with respect to the toner image Q as described below.

(A) When formation of an electrostatic latent image on the photosensitive drum 40 is started (i.e., when the image writing signal is output), the calculation unit 102 sets ideal time $t_h$ from when the conveying unit 80 starts to convey the paper P at an ideal speed Vh to when the paper detection unit 71 detects the leading edge of the paper P. The ideal speed Vh indicates a conveying speed of the paper P (by the conveying unit 80) at which it is assumed that misalignment between the toner image Q and the paper P will not occur.

(B) Also when the image writing signal is output, the calculation unit 102 measures actual time $t_r$ from when the conveying unit 80 starts to convey the paper P at an actual (current) conveying speed Vr to when the paper detection unit 71 detects the leading edge of the paper P.

(C) Next, the calculation unit 102 calculates a time difference $\Delta t = t_r - t_h$ between the actual time $t_r$ and the ideal time $t_h$.

(D) Then, the calculation unit 102 multiplies the time difference $\Delta t$ by the ideal speed Vh ($\Delta t \times Vh$) to obtain a correction value $\Delta X$ at the time when the leading edge of the paper P is detected by the paper detection unit 71.

Thus, the calculation unit 102 calculates the correction value $\Delta X$ through steps (A) through (D) described above as soon as the leading edge of the paper P is detected by the paper detection unit 71.

Steps (A) through (D) described above represent an exemplary method of calculating the correction value $\Delta X$. Any other appropriate method may be used to calculate the correction value $\Delta X$.

The user sets a first target conveying speed Vi of the conveying unit 80 or a target position Xi of the paper P in the setting unit 106. The target position Xi indicates the position of the paper P (or the distance the paper P is conveyed) that normally changes according to the gradient of the first target conveying speed Vi and is controlled based on the paper detection signal output from the paper detection unit 71. When the first target conveying speed Vi of the conveying unit 80 is set, the target position Xi of the paper P can be obtained by integrating the first target conveying speed Vi. On the other hand, when the target position Xi of the paper P is set, the first target conveying speed Vi of the conveying unit 80 can be obtained by differentiating the target position Xi.

A detection unit 104 (see FIG. 4) detects a current position Xr of the paper P. The detection unit 104 is, for example, implemented by a rotary encoder and mounted on an output shaft of the driving unit 73 (e.g., a motor) or a rotating shaft of one of the drive rollers 70. The detection unit 104 may be configured to calculate the current conveying speed Vr of the conveying unit 80 (or the paper P) by detecting current positions of the paper P at predetermined time intervals (e.g., every one second) and calculating the difference between the detected positions or by measuring the pulse interval of the rotary encoder based on the reference clock. The current position Xr or the current conveying speed Vr is input to the position controller 108 (i.e., used for feedback control). The image forming apparatus may also include other components such as a motor transmission system near the driving unit 73 and the detection unit 104. However, such components are omitted in FIG. 3 for brevity. The driving unit 73 and the transmission system for the driving unit 73 may be called controlled objects or plants.

As described above, the first target conveying speed Vi of the conveying unit 80 or the target position Xi of the paper P is set in the setting unit 106. When the first target conveying speed Vi of the conveying unit 80 is set in the setting unit 106, the detection unit 104 detects the current conveying speed Vr of the conveying unit 80.

The position controller 108 receives the first target conveying speed Vi of the conveying unit 80 (or the target position Xi of the paper P) from the setting unit 106, the correction value ⊿X from the calculation unit 102, and the current conveying speed Vr of the conveying unit 80 (or the current position Xr of the paper P) from the detection unit 104.

Then, the position controller 108 calculates a second target conveying speed based on the first target conveying speed Vi of the conveying unit 80 (or the target position Xi of the paper 2), the correction value ⊿X, and the current conveying speed Vr of the conveying unit 80 (or the current position Xr of the paper 2). Details of the calculations are described later.

Referring back to FIG. 4, the conveyance control unit 72 may further include a limiting unit 112 and a switching unit 116. The limiting unit 112 and the switching unit 116 are described later. In the first embodiment, however, it is assumed that the conveyance control unit 72 does not include the limiting unit 112 and the switching unit 116. Therefore, in the first embodiment, the second target conveying speed calculated by the position controller 108 is input to the adding unit 114 of a speed control loop X shown in FIG. 4.

The second target conveying speed is used as a target speed in the speed control loop X.

The speed control loop X is described below. The adding unit 114 calculates a speed error $e_V$ using a formula (1) below.

$$e_v = \text{second target conveying speed} + \text{first target conveying speed } Vi - \text{current conveying speed } Vr \tag{1}$$

The speed error $e_v$ calculated by the adding unit 114 is input to the speed controller 110. The speed controller 110 controls the driving unit 73 based on the speed error $e_v$. More specifically, the speed controller 110 calculates a value indicating a voltage (or current) to be supplied to the driving unit 73 (e.g., a motor) based on the speed error $e_v$ and outputs the calculated value to a motor driver (not shown). The motor driver outputs a voltage (or current) corresponding to the value input from the speed controller 110 to drive (or apply torque to) the driving unit 73. As a result, the paper P is conveyed by the conveying unit 80.

A compensator of the speed controller 110 may be designed based on any appropriate control theory such as a classic control theory, a modern control theory, or a robust control theory. For example, the speed controller 110 may be designed based on a typical classic control theory and configured to perform proportional-plus-integral-plus-derivative control (PID control), proportional-plus-integral control (PI control), or phase compensation control.

The current conveying speed Vr of the conveying unit 80 is detected again and input to the position controller 108. Then, the process in the speed control loop X (a process of correcting the current conveying speed Vr of the conveying unit 80) is repeated for a predetermined number of times or a predetermined period of time to reduce the speed error $e_v$ close to zero, to make the current conveying speed Vr close to the first target conveying speed Vi, and thereby to reduce the misalignment between the paper P and the toner image Q. Thus, in the first embodiment, a control system including a position control loop Y (the position controller 108) and the speed control loop X is used. This configuration makes it possible to adjust the current conveying speed Vr of the paper P (or the conveying unit 80) and the current position Xr of the paper P and thereby to reduce the misalignment between the toner image Q and the paper P without using a target driving profile.

As shown in FIG. 4, the speed control loop X is formed by the adding unit 114, the speed controller 110, and the detection unit 104. The position control loop Y is formed outside of the speed control loop X. Details of the position control loop Y (i.e., the position controller 108) according to second through fifth embodiments of the present invention are described below with reference to FIGS. 5 through 8. In FIGS. 5 through 8, the limiting unit 112 and the switching unit 116 shown in FIG. 4 are omitted.

Second Embodiment

Figure 5:
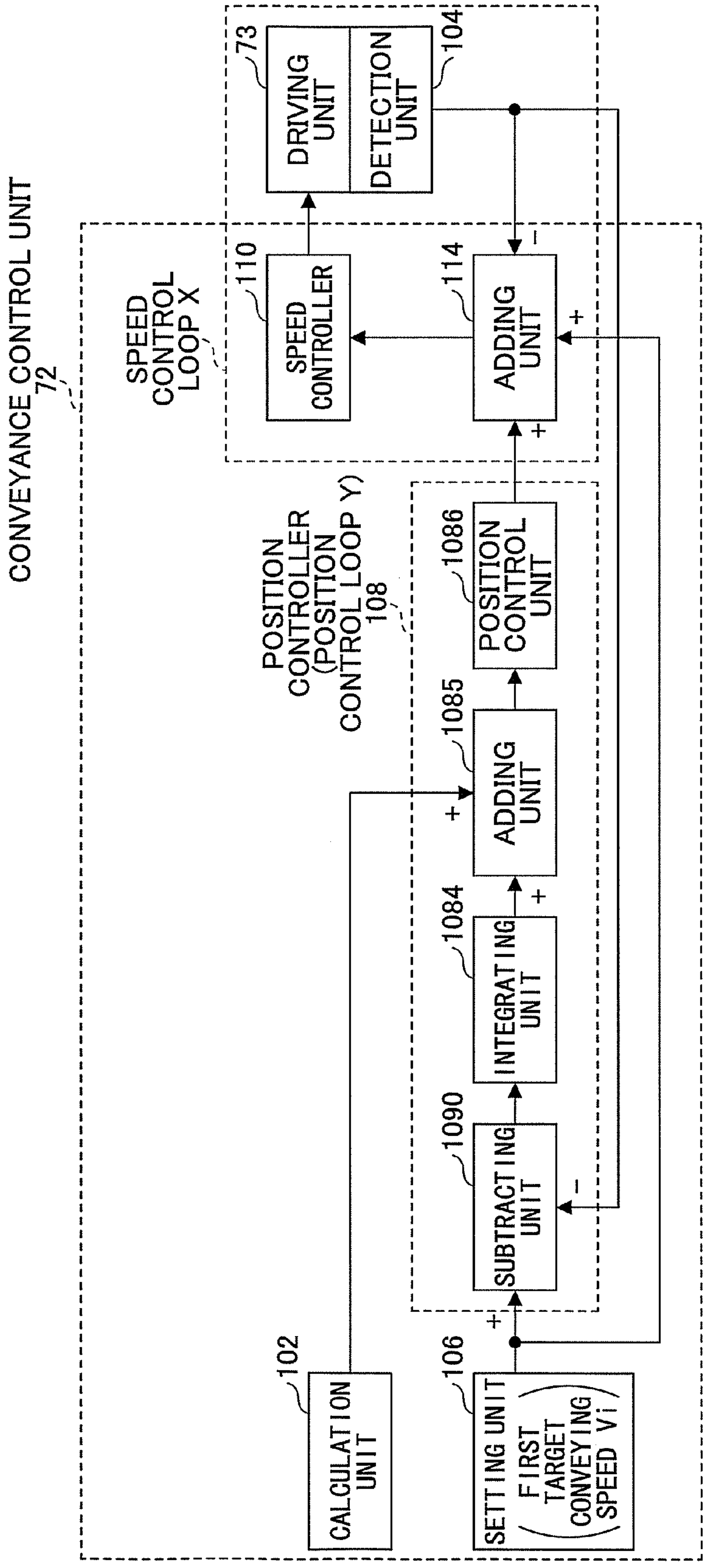
FIG. 5 is a block diagram illustrating a functional configuration of a conveyance control unit according to another embodiment.

As shown in FIG. 5, the position controller 108 of the second embodiment includes a subtracting unit 1090, an integrating unit 1084, an adding unit 1085, and a position control unit 1086.

In the second embodiment, it is assumed that the first target conveying speed Vi of the paper P is set in the setting unit 106. The first target conveying speed Vi set in the setting unit 106 is input to the adding unit 114 and the subtracting unit 1090.

Also, the current conveying speed Vr of the paper P (or the conveying unit 80) detected by the detection unit 104 is also input to the subtracting unit 1090. The subtracting unit 1090 calculates a speed error $e_v$ indicating a difference between the first target conveying speed Vi and the current conveying speed Vr using a formula (2) below.

$$\text{Speed error } e_v = \text{first target conveying speed } Vi - \text{current conveying speed } Vr \tag{2}$$

The speed error $e_v$ calculated by the subtracting unit 1090 is input to the integrating unit 1084.

The integrating unit 1084 calculates a positional deviation $e_p$ by integrating the speed error $e_v$ once. The calculated positional deviation $e_p$ is input to the adding unit 1085. The adding unit 1085 calculates a corrected (or accumulated) positional deviation $e_p'$ by adding the correction value ⊿X to the positional deviation $e_p$. The corrected positional deviation $e_p'$ is input to the position control unit 1086.

The position control unit 1086 calculates a second target conveying speed based on the corrected positional deviation $e_p'$. Similar to the speed controller 110, a compensator of the position control unit 1086 may be configured to obtain the second target conveying speed based on any appropriate control theory such as a classic control theory, a modern control theory, or a robust control theory. For example, the position control unit 1086 may be designed based on a typical classic control theory and configured to perform proportional control (P control). With the simplest configuration, the position control unit 1086 may be configured to obtain the second target conveying speed by multiplying the corrected positional deviation $e_p$' by a proportionality constant β.

The second target conveying speed calculated by the position control unit 1086 is input to the adding unit 114. Subsequent processes performed by the adding unit 114 and other components are substantially the same as those in the first embodiment and therefore their descriptions are omitted here. As shown in FIG. 5, the position controller 108 functions as the position control loop Y. Thus, in the second embodiment, the image forming apparatus includes a control system including the speed control loop X and the position control loop Y. This configuration makes it possible to control the conveying unit 80 and thereby to reduce the misalignment between the toner image Q and the paper P without using a target driving profile.

The conveyance control unit 72 of the second embodiment may be implemented by analog circuits, digital circuits, and software programs.

Third Embodiment

Figure 6:
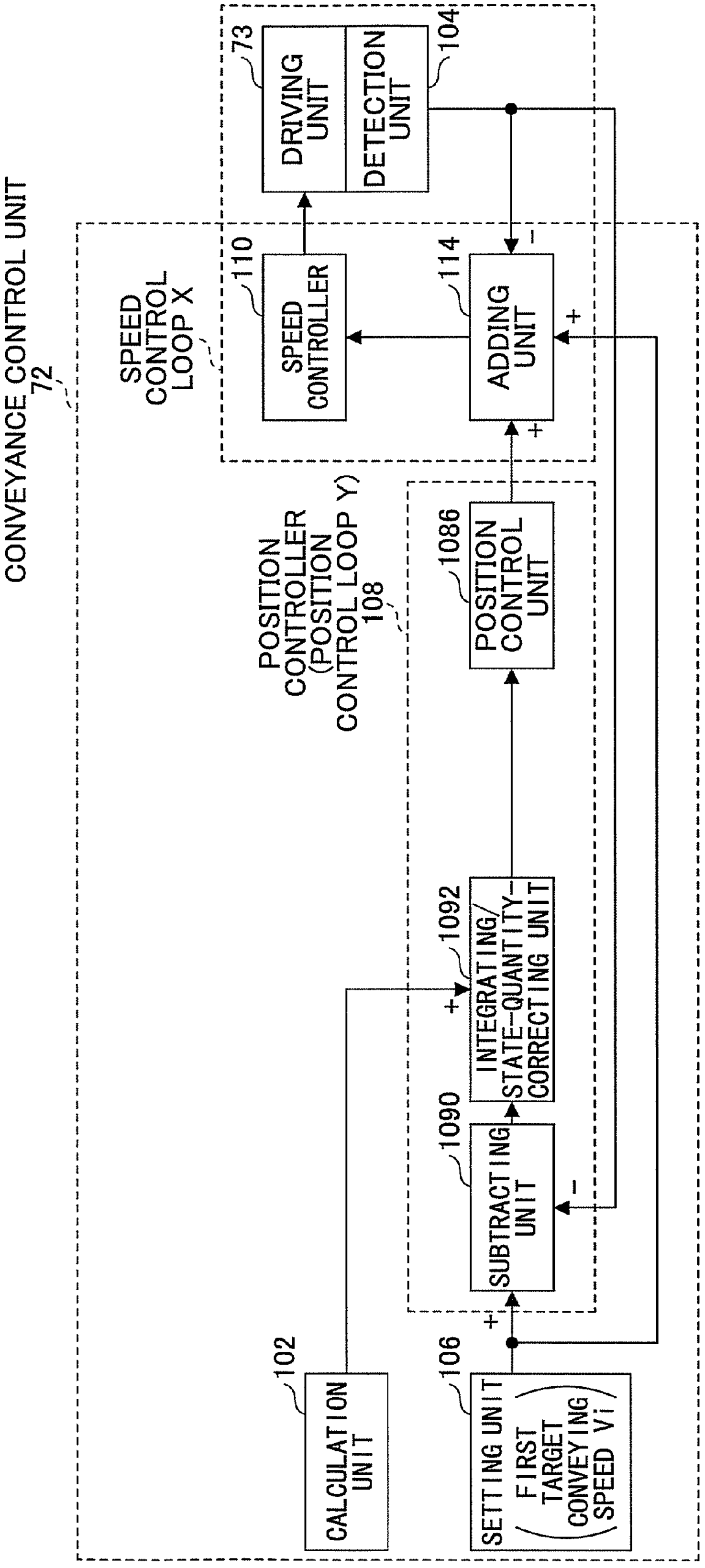
FIG. 6 is a block diagram illustrating a functional configuration of a conveyance control unit according to another embodiment.

FIG. 6 is a block diagram illustrating a functional configuration of the conveyance control unit of the third embodiment. As shown in FIG. 6, the position controller 108 of the third embodiment includes a subtracting unit 1090, an integrating-and-state-quantity-correcting unit 1092, and a position control unit 1086. The position controller 108 of FIG. 6 is different from the position controller 108 of FIG. 5 in that the integrating unit 1084 and the adding unit 1085 are replaced with the integrating-and-state-quantity-correcting unit 1092. Also in the third embodiment, it is assumed that the first target conveying speed Vi of the paper P is set in the setting unit 106.

The subtracting unit 1090 calculates a speed error $e_v$ using the formula (2) above. The speed error $e_v$ calculated by the subtracting unit 1090 is input to the integrating-and-state-quantity-correcting unit 1092.

The integrating-and-state-quantity-correcting unit 1092 integrates the speed error $e_v$ to obtain an integral indicating state quantity (positional deviation) and adds the correction value ⊿X to the integral to obtain a positional deviation $e_p$. Thus, the integrating-and-state-quantity-correcting unit 1092 is capable of correcting (or changing) the integral based on the correction value ⊿X. The integrating-and-state-quantity-correcting unit 1092 outputs the positional deviation $e_p$ to the position control unit 1086. Subsequent processes are substantially the same as those in the second embodiment and therefore their descriptions are omitted here.

Since the integrating-and-state-quantity-correcting unit 1092 is used, the conveyance control unit 72 of the third embodiment may be implemented by digital circuits and software programs. Also, the integrating-and-state-quantity-correcting unit 1092 makes it possible to directly correct the integral (state quantity) and eliminates the need to add the correction value ⊿X to the integral in each correction process and to reset the correction value ⊿X after the correction process is completed. Thus, this configuration makes it possible to reduce the calculation cost.

The conveyance control unit 72 of the third embodiment may be implemented by digital circuits and software programs.

With the configurations of the second and third embodiments, it is not necessary to provide a component for directly detecting the position of the paper P.

<Variation of Third Embodiment>

Next, a variation of the third embodiment is described. In the third embodiment, the positional deviation $e_p$ is calculated by the integrating-and-state-quantity-correcting unit 1092. Normally, a disturbance applied to, for example, the paper P is removed by the feedback control. If the correction value ⊿X is added to the integral (state quantity) before the disturbance is removed, the correction made by adding the correction value ⊿X may become excessive. For this reason, in this variation, the output "integral (state quantity)+correction value ⊿X" of the integrating-and-state-quantity-correcting unit 1092 is replaced with the correction value ⊿X or a correction value ⊿X obtained taking into account a normal positional deviation. In other words, the integrating-and-state-quantity-correcting unit 1092 outputs the correction value ⊿X as the positional deviation $e_p$ to the position control unit 1086. This makes it possible to accurately correct the position error even if the positional deviation $e_p$, that is generated while the paper P is conveyed to the resist rollers 49 has not been removed before the paper P reaches the paper detection unit 71.

Fourth Embodiment

Figure 7:
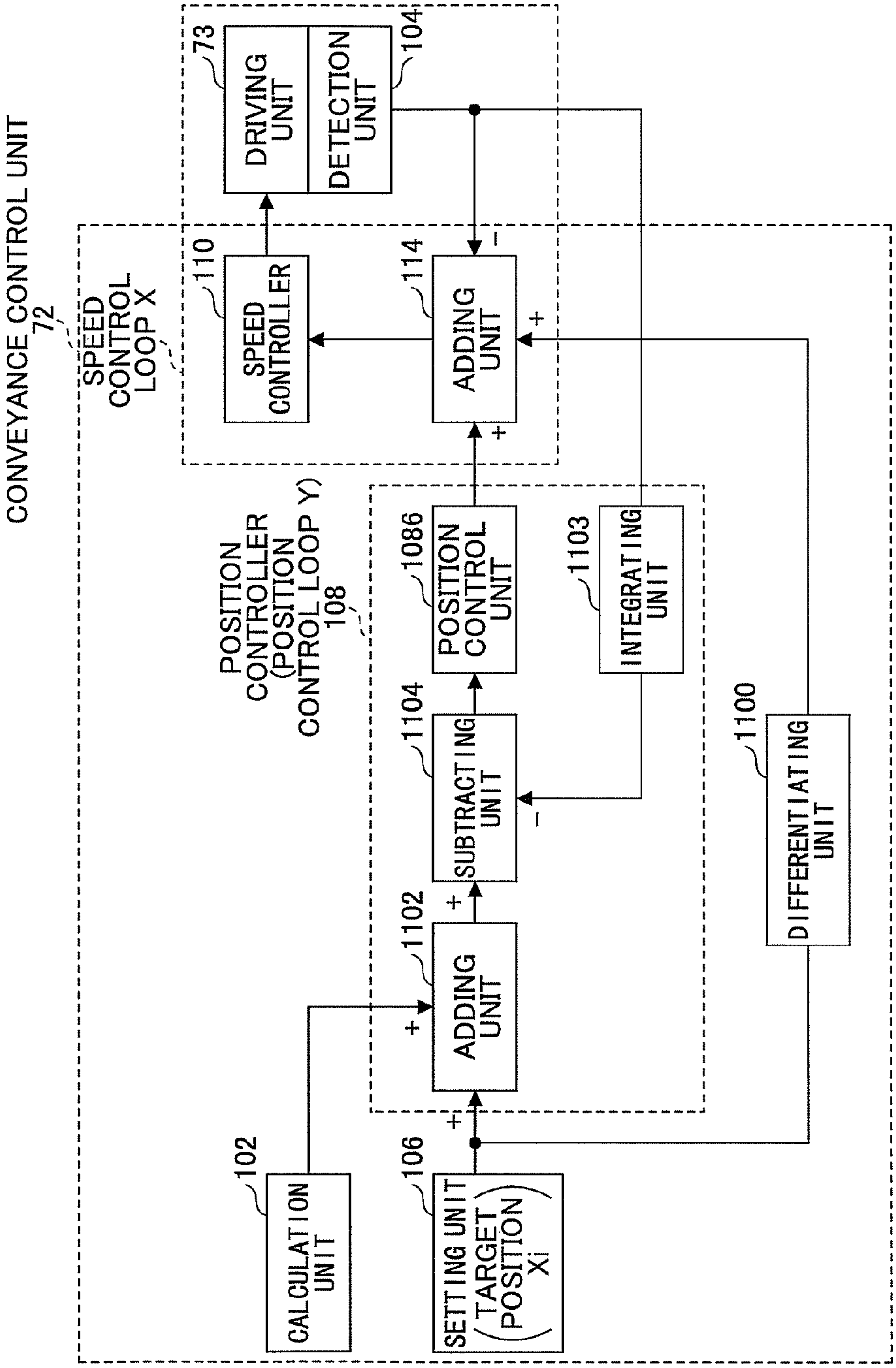
FIG. 7 is a block diagram illustrating a functional configuration of a conveyance control unit according to another embodiment.

FIG. 7 is a block diagram illustrating a functional configuration of the conveyance control unit 72 of the fourth embodiment. As shown in FIG. 7, the position controller 108 of the fourth embodiment includes an adding unit 1102, a subtracting unit 1104, a position control unit 1086, and an integrating unit 1103.

In the fourth embodiment, it is assumed that the target position Xi of the paper P is set in the setting unit 106. The detection unit 104 detects the current conveying speed Vr. The current conveying speed Vr is input to the integrating unit 1103. The integrating unit 1103 calculates the current position Xr of the paper P by integrating the current conveying speed Vr.

Instead of detecting the (rotational or angular) speed of the driving unit 73, the (rotational or angular) position of the driving unit 73 may be detected. The speed of the driving unit 73 may be detected by measuring the slit interval of the encoder (the detection unit 104) with a cycle counter or by using a tachogenerator. The position of the driving unit 73 may be detected by counting pulses of the encoder with a counter.

The adding unit 1102 receives the target position Xi from the setting unit 106 and the correction value ⊿X from the calculation unit 102. The adding unit 1102 calculates a corrected target position Xi' by adding the target position Xi and the correction value ⊿X.

The subtracting unit 1104 receives the corrected target position Xi' from the adding unit 1102 and the current position Xr from the integrating unit 1103. The subtracting unit calculates a positional deviation $e_p$ using a formula (3) below.

$$\text{positional deviation } e_p = \text{corrected target position } Xi' - \text{current position } Xr \tag{3}$$

The calculated positional deviation $e_p$ is input to the position control unit 1086. The position control unit 1086 calculates a second target conveying speed based on the positional deviation $e_p$.

Meanwhile, the differentiating unit 1100 calculates a first target conveying speed Vi by differentiating the target position Xi received from the setting unit 106. The adding unit 114 receives the second target conveying speed from the position control unit 1086, the first target conveying speed Vi from the differentiating unit 1100, and the current conveying speed Vr from the detection unit 104. The adding unit 114 calculates a speed error $e_v$ using the formula (1) above. Subsequent processes are substantially the same as those in the first embodiment and therefore their descriptions are omitted here.

In FIG. 7, the differentiating unit 1100 calculates the first target conveying speed Vi by differentiating the target position Xi and inputs the first target conveying speed Vi to the adding unit 114 in the speed control loop X. In other words, in this embodiment, feedforward control is performed to more accurately follow the changes in the target position, i.e., the target conveying speed.

As shown in FIG. 7, the position controller 108 functions as the position control loop Y.

Thus, in the fourth embodiment, the image forming apparatus includes a control system including the speed control loop X and the position control loop Y. This configuration makes it possible to reduce the misalignment between the toner image Q and the paper P without using a target driving profile.

The conveyance control unit 72 of the fourth embodiment may be implemented by analog circuits, digital circuits, and software programs.

Fifth Embodiment

Figure 8:
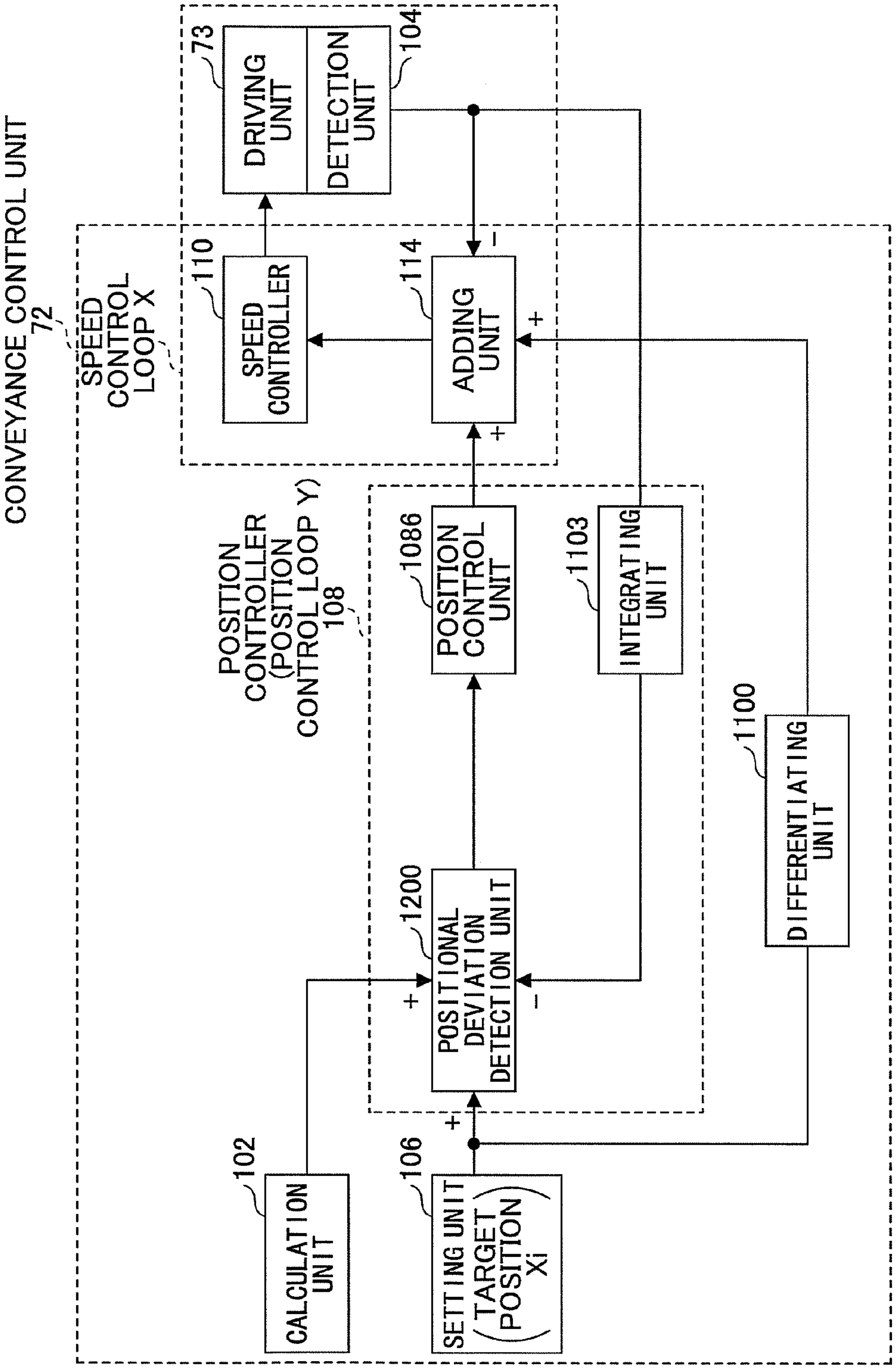
FIG. 8 is a block diagram illustrating a functional configuration of a conveyance control unit according to another embodiment.

FIG. 8 is a block diagram illustrating a functional configuration of the conveyance control unit of the fifth embodiment. As shown in FIG. 8, the position controller 108 of the fifth embodiment includes a positional deviation detection unit 1200, a position control unit 1086, and an integrating unit 1103.

In the fifth embodiment, it is assumed that the target position Xi of the paper P is set in the setting unit 106. The positional deviation detection unit 1200 receives the target position Xi from the setting unit 106, the current position Xr of the paper P from the integrating unit 1103, and the correction value ⊿X from the calculation unit 102.

The positional deviation detection unit 1200 calculates a positional deviation $e_p$ (error count) indicating a difference between the target position Xi and the current position Xr and then calculates a corrected positional deviation $e_p'$ by adding the correction value ⊿X to the positional deviation $e_p$. For example, the positional deviation detection unit 1200 is implemented by an error counter. The corrected positional deviation $e_p'$ is input to the position control unit 1086. Subsequent processes are substantially the same as those in the fourth embodiment and therefore their descriptions are omitted here.

Using the positional deviation detection unit 1200 makes it possible to prevent the overflow of a position counter used to perform consecutive correction processes.

<Variation of Fifth Embodiment>

Next, a variation of the fifth embodiment is described. In the fifth embodiment, the positional deviation $e_p$ is calculated by the positional deviation detection unit 1200.

Normally, a disturbance applied to, for example, the paper P is removed by the feedback control. If the correction value ⊿X is added to the positional deviation $e_p$ before the disturbance is removed, the correction made by adding the correction value ⊿X may become excessive. For this reason, in this variation, the output "positional deviation $e_p$ (error count)" of the positional deviation detection unit 1200 is replaced with the correction value ⊿X or a correction value ⊿X obtained taking into account a normal positional deviation. In other words, the positional deviation detection unit 1200 outputs the correction value ⊿X as the positional deviation $e_p$. This makes it possible to accurately correct the misalignment even if the positional deviation $e_p$ that is generated while the paper P is conveyed to the resist rollers 49 has not been removed before the paper P reaches the paper detection unit 71.

In the second through fifth embodiments (FIGS. 5 through 8), the position control loop Y is provided outside of the speed control loop X. In the speed control loop X, the conveying speed is corrected (to make the correction value ⊿X close to zero) based on a target conveying speed obtained in the position control loop Y. Thus, the second through fifth embodiments make it possible to reduce the misalignment between the toner image Q and the paper P without using a target driving profile.

The conveyance control unit 72 of the fifth embodiment may be implemented by digital circuits and software programs.

Sixth Embodiment

Next, a sixth embodiment of the present invention is described. Take, for example, the second embodiment described with reference to FIG. 5. In the second embodiment, the adding unit 1085 calculates the corrected positional deviation $e_p'$ by adding the correction value ⊿X to the positional deviation $e_p$ (the integral) obtained by the integrating unit 1084; and the position control unit 1086 obtains the second target conveying speed based on the corrected positional deviation $e_p'$ and inputs the second target conveying speed to the position control loop X.

In this process, if the correction value is large, the positional deviation is drastically changed by the addition of the correction value and as a result, the second target conveying speed to be input to the position control loop X is also changed drastically. Here, the rate of change of the second target conveying speed, i.e., the acceleration of the conveying speed of the paper P, is in proportion to the torque (or force) applied by the rollers 16 and 23 to the paper P. Therefore, if the second target conveying speed increases drastically, the force applied by the rollers 16 and 23 to the paper P also increases drastically. The increased force may increase the noise and the slippage between the rollers and 23 and the paper P and may reduce the image quality.

The sixth embodiment provides an image forming apparatus that makes it possible to prevent the drastic increase of the force applied by the rollers 16 and 23 to the paper P and thereby to reduce the noise and the slippage even if the correction value is large. In the second embodiment, the adding unit 1085 adds the entire correction value at once to the positional deviation (the integral). Meanwhile, in the sixth embodiment, the adding unit 1085 adds a small part (small correction value) of the correction value to the positional deviation at a time. Below, combinations of the sixth embodiment and the respective configurations shown in FIGS. 5, 6, 7, and 8 are called embodiments 6-1, 6-2, 6-3, and 6-4.

Embodiment 6-1

The embodiment 6-1 is described below with reference to FIG. 5. In this embodiment, the calculation unit 102 calculates the correction value ⊿X and also calculates a small correction value dxs that is a division of the correction value ⊿X. The small correction value dxs is determined based on the correction value ⊿X, a correction distance L, a surface speed Vb of the intermediate transfer belt 10, and a predetermined interval T. The correction distance L indicates the distance between the drive rollers 70 and the secondary transfer position A shown in FIG. 3. The predetermined interval T indicates an interval at which the small correction value dxs is added to the positional deviation. The surface speed Vb of the intermediate transfer belt 10 is set, for example, by the user. The predetermined interval T and the surface speed Vb are, for example, stored in a main memory 512 or a secondary storage 513 (see FIG. 12) of the image forming apparatus.

The calculation unit 102 calculates the small correction value dxs as described below. Here, it is assumed that the correction value ⊿X is 5 mm, the correction distance L is 30 mm, the surface speed Vb is 300 mm/s, and the predetermined interval T is 1 ms.

First, the calculation unit 102 calculates "correction time=correction distance L/surface speed Vb". In this example, the correction time is 30 (mm)/300 (mm/s)=0.1 s. Next, the calculation unit 102 calculates "increased speed=correction value/correction time". In this example, the increased speed is 5 (mm)/0.1 (s)=50 mm/s.

Next, the calculation unit 102 calculates "small correction value dxs=increased speed×predetermined interval T". In this example, the small correction value dxs is 50 (mm/s)/1 (ms) =50 μm/samp. The calculation unit 102 obtains the small correction value dxs as described above.

Then, the calculation unit 102 calculates "number of correction steps N=correction value/small correction value dxs". The calculation unit 102 uses the integer part of the quotient of "correction value/small correction value dxs" as the number of correction steps N and sets "dxr" at the remainder.

Assuming that the correction value ⊿X is 1.55 mm and the small correction value dxs is 20 μm, the calculation unit 102 calculates "1.55 (mm)/20 (μm)" and obtains N=77 and dxr=10 μm.

The adding unit 1085 calculates a corrected positional deviation by adding the obtained small correction value dxs (in the above example, 20 μm) to the positional deviation received from the integrating unit 1084 and outputs the corrected positional deviation to the position control unit 1086. The position control unit 1086 calculates a second target conveying speed based on the corrected positional deviation and inputs the second target conveying speed to the speed control loop X. Then, the current conveying speed Vr or the current position Xr detected by the detection unit 104 is input to the subtracting unit 1090.

Figure 13:
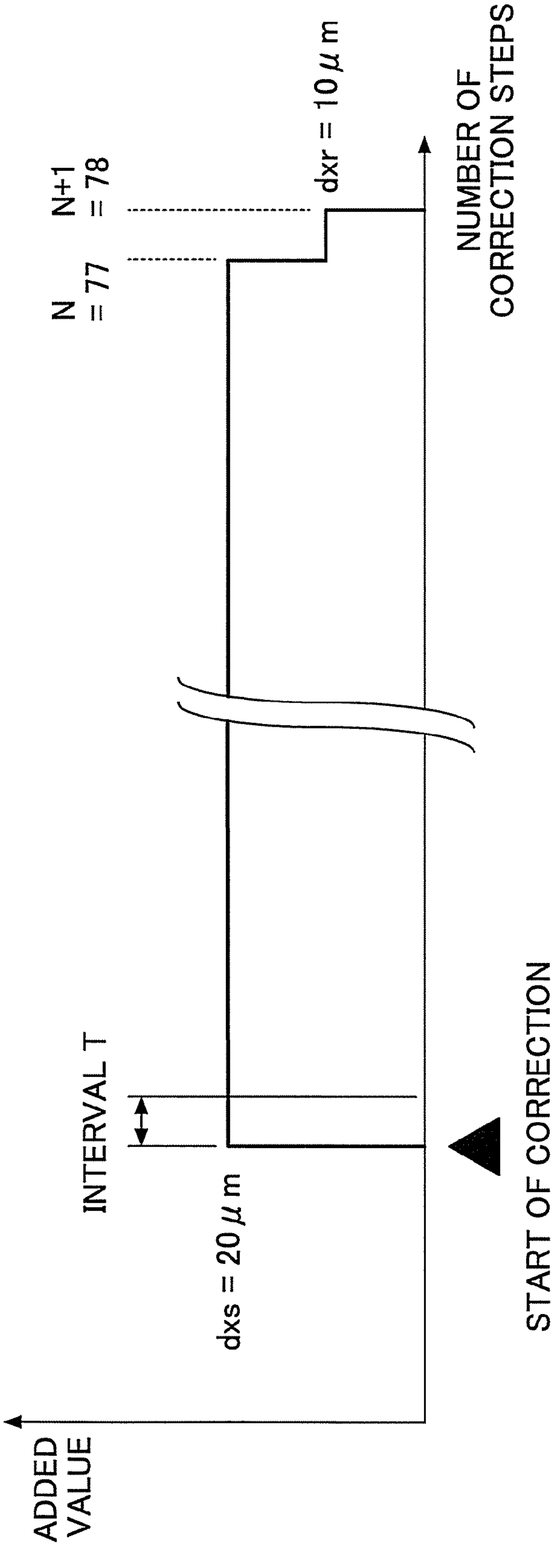
FIG. 13 is a graph showing a relationship between an added value and the number of correction steps.
Figure 14:
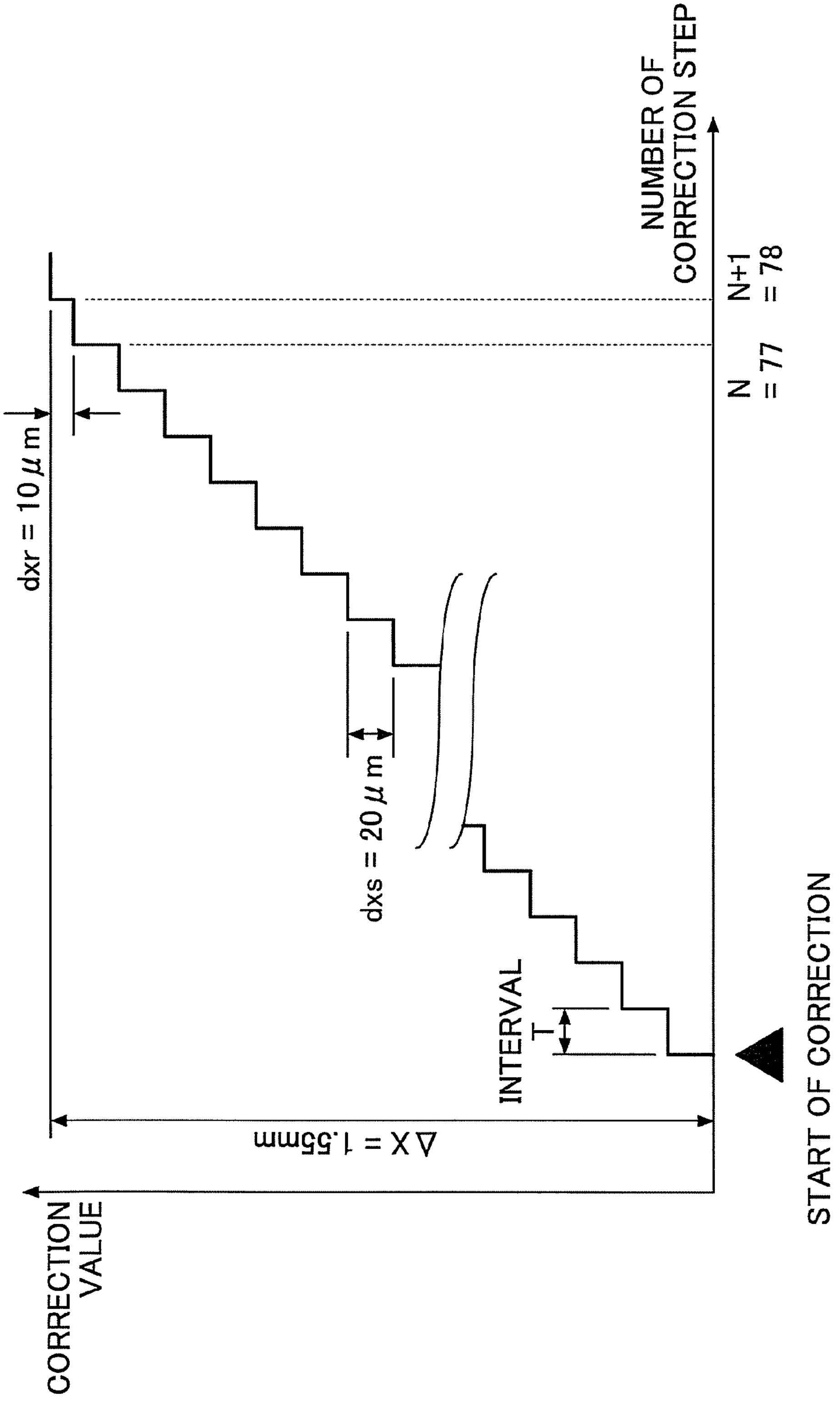
FIG. 14 is a graph showing a relationship between a correction value and the number of correction steps.

A process of adding the small correction value by the adding unit 1085 is described below with reference to FIGS. 13 and 14. In FIG. 13, the vertical axis indicates an added value (small correction value) and the horizontal axis indicates the number of correction steps. In FIG. 14, the vertical axis indicates the correction value (or a total added value) and the horizontal axis indicates the number of correction steps.

As shown in FIGS. 13 and 14, the adding unit 1085 repeatedly adds the small correction value dxs (in this example, 20 μm) to the positional deviation at the predetermined interval T for the number of correction steps N (in this example, N=77). Then, at the N+1st correction step (in this example, 78th correction step) the adding unit 1085 adds the remainder dxr (in this example, 10 μm) to the positional deviation. In other words, the adding unit 1085 adds the small correction value dxs (and the remainder dxr) to the positional deviation at the predetermined interval T to obtain a corrected positional deviation until the total added value reaches the correction value ⊿X. Thus, the adding unit 1085 of this embodiment adds the correction value ⊿X to the positional deviation in steps.

As described above, in the embodiment 6-1, the adding unit 1085 is configured to repeatedly add the small correction value dxs to the positional deviation at the predetermined interval T for the number of correction steps N. With this configuration, even if the correction value is large, the positional deviation is not drastically changed by the addition of the correction value and the second target conveying speed to be input to the position control loop X is not changed drastically. This in turn makes it possible to prevent the drastic increase of the force applied by the rollers 16 and 23 to the paper P, to reduce the noise and the slippage, and thereby to accurately align the toner image Q and the paper P and improve the image quality. Each time after the adding unit 1085 adds the small correction value dxs (or dxr) to the positional deviation to obtain a corrected positional deviation, the corrected positional deviation is input to the position control unit 1086, and the position control unit 1086 obtains a second target conveying speed. With this configuration, the change in the second target conveying speed to be input to the speed control loop X is kept small and therefore it is not necessary to provide the limiting unit 112 described later.

Embodiment 6-2

The embodiment 6-2 is described below with reference to FIG. 6. The integrating-and-state-quantity-correcting unit 1092 repeatedly adds the small correction value dxs (in this example, 20 μm) to the integral (positional deviation), which is obtained by the integrating-and-state-quantity-correcting unit 1092 itself, at the predetermined interval T for the number of correction steps N (in this example, N=77). Then, at the N+1st correction step (in this example, 78th correction step), the integrating-and-state-quantity-correcting unit 1092 adds the remainder dxr (in this example, 10 μm) to the integral (see FIGS. 13 and 14). In other words, the integrating-and-state-quantity-correcting unit 1092 adds the small correction value dxs (and the remainder dxr) to the integral at the predetermined interval T to obtain a corrected positional deviation until the total added value reaches the correction value ⊿X. Thus, the integrating-and-state-quantity-correcting unit 1092 of this embodiment adds the correction value ⊿X to the integral in steps.

The embodiment 6-2 also has advantageous effects similar to those of the embodiment 6-1.

Embodiment 6-3

The embodiment 6-3 is described below with reference to FIG. 7. In this embodiment, the adding unit 1102 repeatedly adds the small correction value dxs (in this example, 20 μm) to the target position received from the setting unit 106 at the predetermined interval T for the number of correction steps N (in this example, N=77).

Then, at the N+1st correction step (in this example, 78th correction step), the adding unit 1102 adds the remainder dxr (in this example, 10 μm) to the target position (see FIGS. 13 and 14). In other words, the adding unit 1102 adds the small correction value dxs (and the remainder dxr) to the target position at the predetermined interval T to obtain a corrected target position until the total added value reaches the correction value ⊿x. Thus, the adding unit 1102 of this embodiment adds the correction value ⊿X to the target position in steps.

The embodiment 6-3 also has advantageous effects similar to those of the embodiment 6-1.

Embodiment 6-4

The embodiment 6-4 is described below with reference to FIG. 8. In this embodiment, the positional deviation detection unit 1200 repeatedly adds the small correction value dxs (in this example, 20 μm) to the positional deviation, which is obtained by the positional deviation detection unit 1200 itself, at the predetermined interval T for the number of correction steps N (in this example, N=77). Then, at the N+1st correction step (in this example, 78th correction step) the positional deviation detection unit 1200 adds the remainder dxr (in this example, 10 μm) to the positional deviation. In other words, the positional deviation detection unit 1200 adds the small correction value dxs (and the remainder dxr) to the positional deviation at the predetermined interval T to obtain a corrected positional deviation until the total added value reaches the correction value ⊿X. Thus, the positional deviation detection unit 1200 of this embodiment adds the correction value ⊿X to the positional deviation in steps.

The embodiment 6-4 also has advantageous effects similar to those of the embodiment 6-1.

<Limiting Unit 112>

Next, the limiting unit 112 shown in FIG. 4 is described. As described above, the correction value ⊿X is added to the positional deviation $e_p$ in the second embodiment (FIG. 5), the third embodiment (FIG. 6), and the fifth embodiment (FIG. 8); and the correction value ⊿X is added to the target position Xi in the fourth embodiment (FIG. 7). In some cases, the positional deviation $e_p$ becomes large and as a result, the second target conveying speed output from the position control unit 1086 becomes large. Depending on the gain (e.g., the proportionality constant β) by which the positional deviation $e_p$ (or $e_p'$) is multiplied at the position control unit 1086, the second target conveying speed may become greater than the maximum speed of the conveying unit 80 or a driving system including the driving unit 73 (i.e., the second target conveying speed may be calculated without taking into account the saturation of the driving system). This in turn increases an integral (state quality) calculated by the speed controller 110 and may impair the response (wind-up phenomenon). Also, if the second target conveying speed input to the speed control loop X is too large or too small, the controlled objects may be saturated and the speed error may not be properly corrected.

The limiting unit 112 may be used to prevent the above problems. The limiting unit 112 allows only the second target conveying speed that is within a predetermined range to pass through. For example, the limiting unit 112 may be configured to allow only the second target conveying speed that is greater than or equal to a lower limit and less than or equal to an upper limit to pass through.

Thus, the limiting unit 112 limits the second target conveying speed to prevent the conveying unit 80 from being accelerated or decelerated beyond its limits. When the second target conveying speed is greater than the upper limit or less than the lower limit, the limiting unit 112 outputs a predetermined speed.

Using the limiting unit 112 makes it possible to input an appropriate second target conveying speed to the speed control loop X and thereby makes it possible to properly correct the speed error. In other words, the limiting unit 112 makes it possible to prevent saturation of the speed control loop X or allows the speed controller 110 to control the conveying unit 80 within its maximum and minimum speeds.

<Switching Unit 116>

The switching unit 116 shown in FIG. 4 is described below. As described above with reference to FIG. 3, the paper P is conveyed by the conveying unit 80 including the resist rollers 49 and the drive rollers 70. When the position of the paper P is controlled using multiple rollers as shown in FIG. 3, a strong force may be applied by the rollers to the paper P and as a result, the paper P may be wrinkled or a paper jam may occur.

The switching unit 116 may be used to prevent these problems. The switching unit 116 allows the user to select whether to connect a movable end 1163 to a fixed end 1164 or a fixed end 1162. When the movable end 1163 is connected to the fixed end 1164, both of the speed control loop X and the position control loop Y function as described in the first through fifth embodiments. Meanwhile, when the movable end 1163 is connected to the fixed end 1162, "0" is input as the second target conveying speed to the adding unit 114. Accordingly, the adding unit 114 controls the driving unit 73 based on the current conveying speed Vr and the first target conveying speed Vi without using the second target conveying speed. In this case, the position control loop Y may be stopped.

With the switching unit 116, it is possible to control the driving unit 73 using only the speed control loop X if adverse effects (e.g., wrinkles and paper jams) are likely to be caused by a strong force applied to the paper P.

<Variation>

Another variation of the above embodiments is described below.

The position error (the correction value ⊿X) is caused, for example, by rollers (e.g., the drive rollers 70) that are deformed due to aging or after a large number of image forming processes or slippage (transmission loss) between the paper P and the rollers. The correction value ⊿X also increases due to a temperature or humidity change over time or after a large number of image forming processes.

To correct a large correction value ⊿X (position error), the speed controller 110 has to apply high torque to the driving unit 73.

Figure 9:
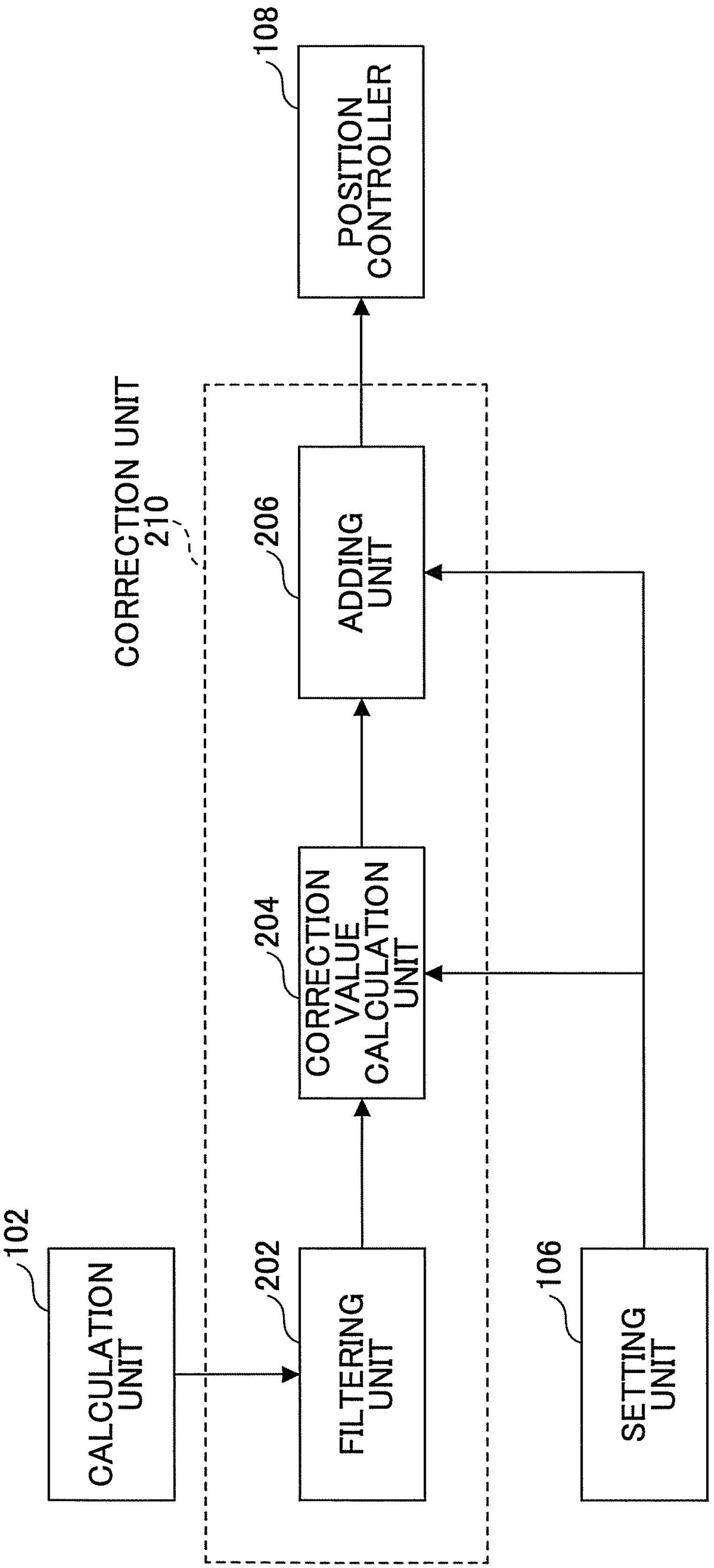
FIG. 9 is a block diagram illustrating a functional configuration of a correcting unit.

For the above reasons, in this variation, the first target conveying speed Vi is corrected to reduce the correction value ⊿X. A method/configuration for correcting the first target conveying speed Vi is described below. FIG. 9 is a block diagram illustrating a functional configuration of a correcting unit 210. The correcting unit 210 includes a filtering unit 202, a correction value calculation unit 204, and an adding unit 206.

After a predetermined number of image forming processes or a predetermined period of time, the filtering unit 202 performs a low-pass filtering process (averaging process) on correction values ⊿X that are obtained under the same conditions (e.g., the speed of the conveying unit 80 and the type of paper). The filtering unit 202 may be implemented by an infinite impulse response (IIR) filter or a finite impulse response (FIR) filter. The averaged (processed) correction value ⊿X' is input to the correction value calculation unit 204.

Figure 10:
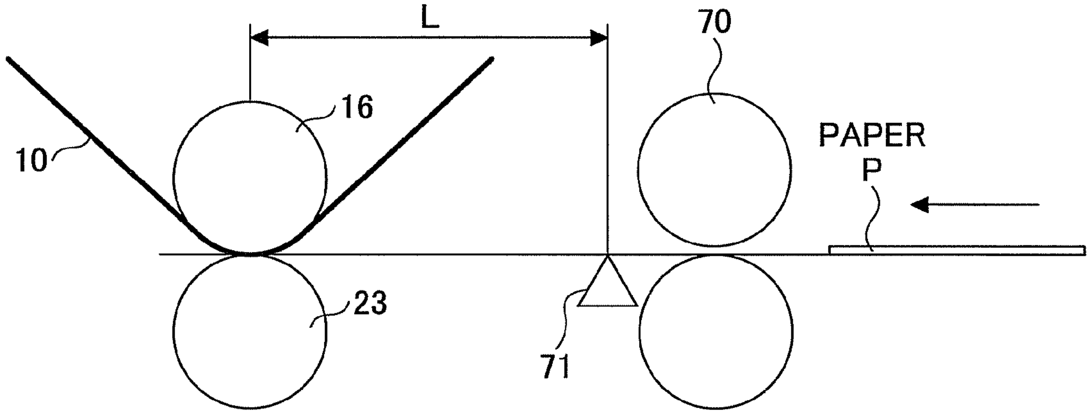
FIG. 10 is a drawing illustrating a distance L.

The correction value calculation unit 204 calculates a correction value ⊿Vi for correcting the first target conveying speed Vi based on the processed correction value ⊿X', the first target conveying speed Vi, and a distance L between the paper detection unit 71 and the secondary transfer position A by using a formula (4) below. The distance L is shown in FIG. 10.

$$\Delta Vi = \Delta X' \times (Vi/L) \quad (4)$$

The calculated correction value ⊿Vi is input to the adding unit 206. The adding unit 206 calculates a corrected first target conveying speed Vi' by adding the correction value ⊿Vi to the first target conveying speed Vi. The corrected first target conveying speed Vi' is input to the position controller 108 and other appropriate components and processes as described in the above embodiments are performed using the corrected first target conveying speed Vi'.

It is also possible to calculate a corrected target position Xi' by integrating the corrected first target conveying speed Vi'.

Thus, the correction unit 210 makes it possible to correct the first target conveying speed Vi, and/or the target position Xi and thereby makes it possible to reduce the correction value ⊿X. Also, this configuration makes it possible to prevent the above problems without using a detection unit for detecting the temperature change of rollers such as the drive rollers 70. Reducing the correction value ⊿X in turn allows the speed controller 110 to reduce the torque applied to the driving unit 73 and thereby makes it possible to reduce power consumption.

<Operations>

Figure 11:
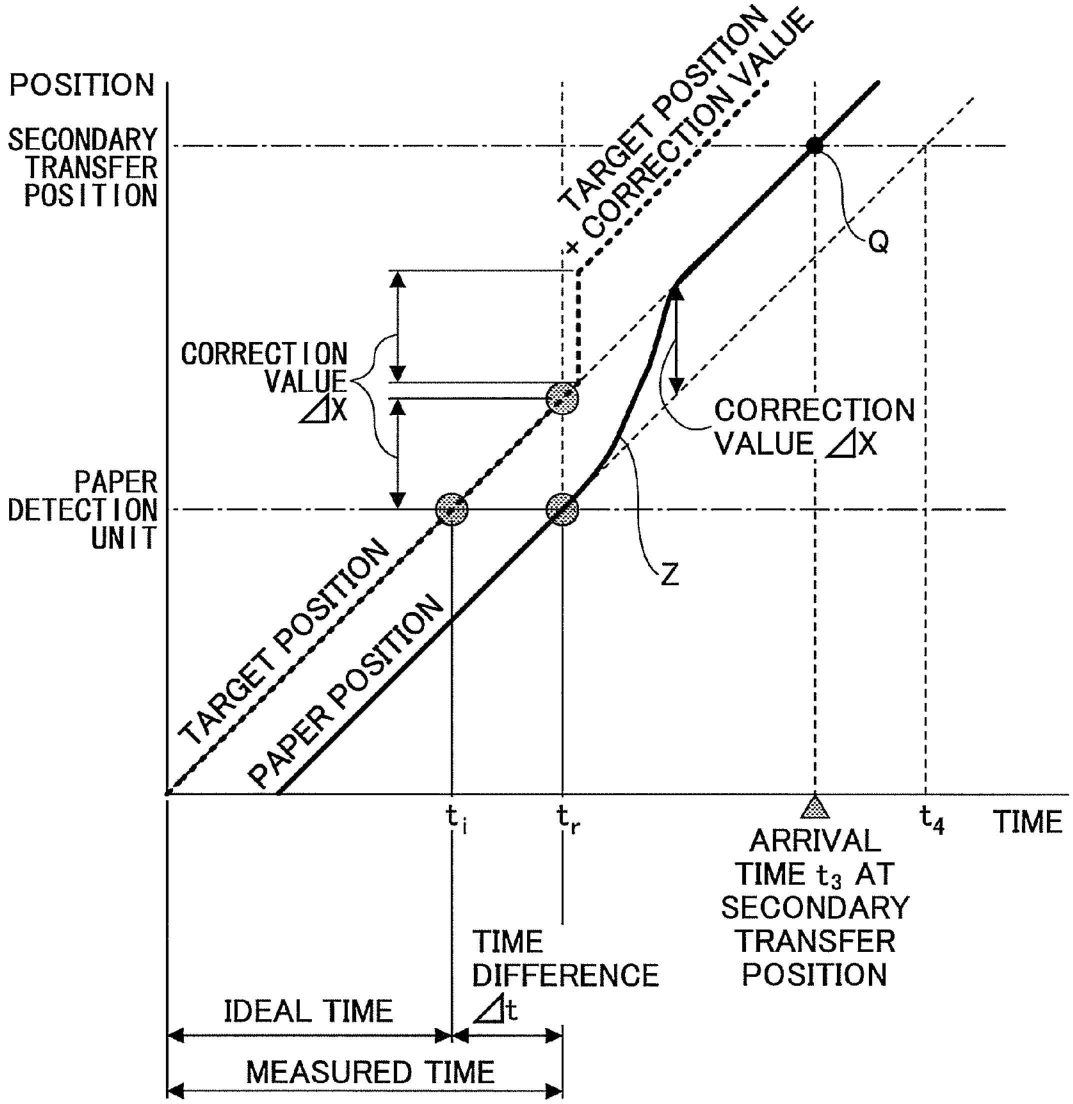
FIG. 11 is a drawing used to describe operations of an image forming apparatus according to an embodiment of the present invention.

Operations of the image forming apparatus according to the above embodiments are described below with reference to FIG. 11. In FIG. 11, a solid line indicates an actual position and an actual speed of the paper P and a dotted line indicates a target position and a target speed of the paper P (or the conveying unit 80).

Also in FIG. 11, the vertical axis indicates positions and the horizontal axis indicates time. A position at which the paper P is detected by the paper detection unit 71 and the secondary transfer position of the secondary transfer unit 22 are indicated on the vertical axis. A target detection time $t_i$ and an actual detection time $t_r$, at the paper detection unit 71 and an actual arrival time $t_3$ at the secondary transfer position are indicated on the horizontal axis.

In the example shown in FIG. 11, the actual conveying speed of the paper P is increased as indicated by a portion of the solid line labeled "Z". Before the conveying speed is increased, the paper P is expected to reach the secondary transfer position at a time $t_4$. Meanwhile, after the conveying speed is increased, the paper P is expected to reach the secondary transfer position at the time $t_3$ that corresponds to a target arrival time. Accordingly, the misalignment between the toner image Q and the paper P is reduced.

<Hardware Configuration>

Figure 12:
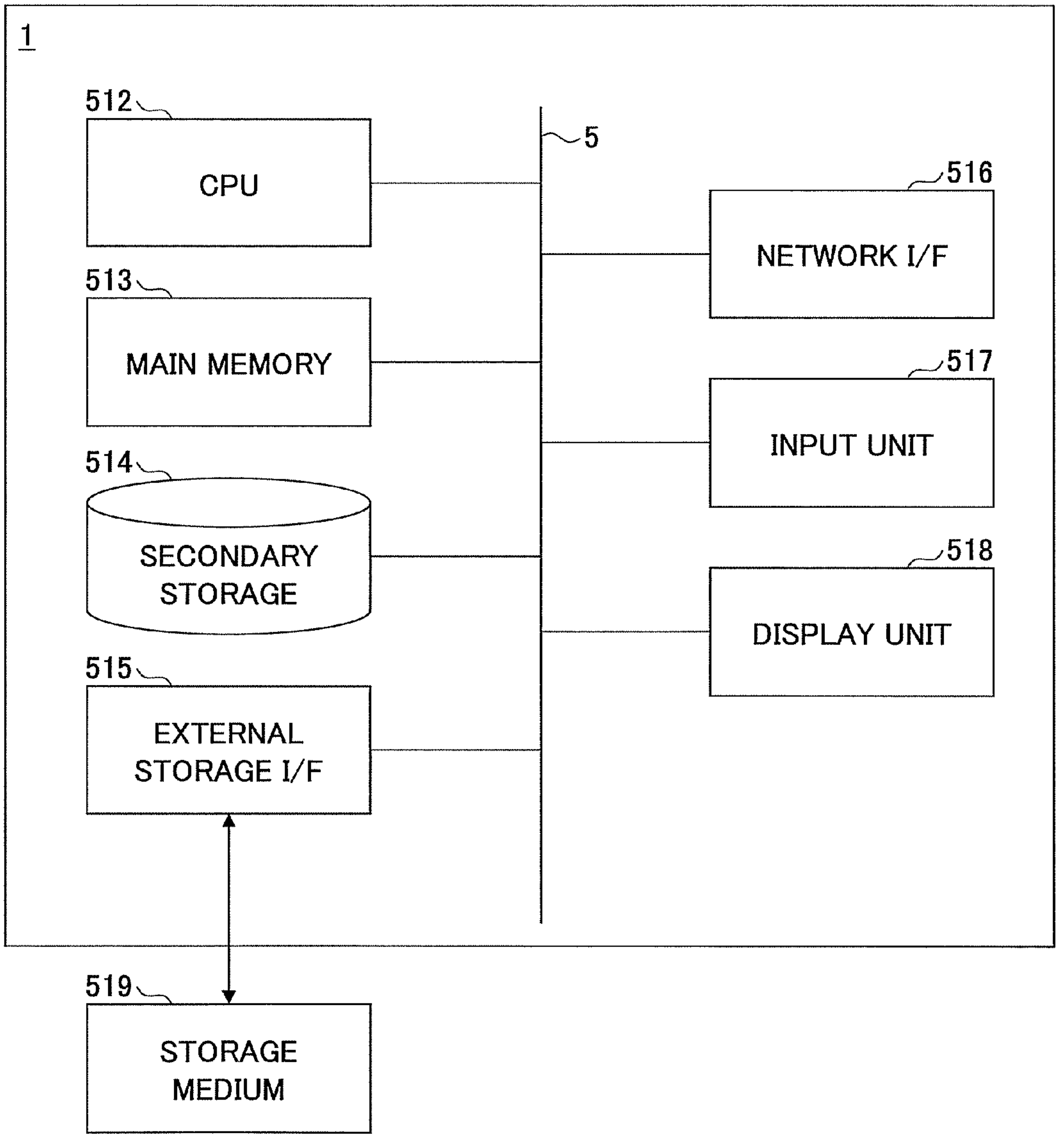
FIG. 12 is a block diagram of an image forming apparatus according to an embodiment of the present invention.

FIG. 12 shows an exemplary hardware configuration of the image processing apparatus (the main unit 1) according to an embodiment of the present invention. The image forming apparatus includes a CPU 512, a main memory 513 (e.g., RAM), a secondary storage 514 (e.g., ROM), an external storage I/F 515, a network I/F 516, an input unit 517, and a display unit 518.

The CPU 512 controls other components of the image forming apparatus and performs calculations and data processing. More specifically, the CPU 512 executes programs stored in the main memory 513 to process data received from an input unit or a storage unit and outputs the processed data to an output unit or a storage unit.

The main memory 513 (temporarily) stores data and software such as basic software (operating system (OS)) and application programs to be executed by the CPU 512.

The secondary storage 514 stores application programs and related data.

The network I/F 516 allows the image forming apparatus to communicate with other devices connected via a network, such as a local area network (LAN) or a wide area network (WAN), implemented by wired and/or wireless data communication channels.

The input unit 517 and the display unit 518 function as a user interface (UI), and are implemented, for example, by a liquid crystal display (LCD) equipped with keys (hard keys) and a touch panel (soft keys implemented by a graphical user interface).

The external storage I/F 514 interfaces the image forming apparatus and a (non-transient) storage medium 519 (e.g., a flash memory, a CD-ROM, or a DVD) connected via a data transmission line such as the universal serial bus (USB).

A program (program code) may be stored in the storage medium 519 and installed via the external storage I/F 515 into, for example, the secondary storage 514 or the main memory 513. The installed program may be executed by the CPU 512 (or a computer) to implement various functions (e.g., the conveyance control unit 72) of the image forming apparatus or to perform an image forming method according to embodiments of the present invention.

The present invention is not limited to the specifically disclosed embodiments, and variations and modifications may be made without departing from the scope of the present invention.

The present application is based on Japanese Priority Application No. 2010-009382 filed on Jan. 19, 2010, and Japanese Priority Application No. 2010-273254 filed on Dec. 8, 2010, the entire contents of which are hereby incorporated herein by reference.

What is claimed is:

1. An apparatus forming an image on a recording medium, the apparatus comprising:

a conveying unit conveying the recording medium;

a driving unit driving the conveying unit;

a first calculation unit calculating a correction value based on a position error of the recording medium with respect to the image;

a detection unit detecting a current conveying speed of the recording medium being conveyed by the conveying unit;

a position controller to which the current conveying speed detected by the detecting unit, one of a predetermined first target conveying speed and a target position of the recording medium, and the correction value calculated by the first calculation unit are input, and that outputs a second target conveying speed;

a second calculation unit to which a value based on the second target conveying speed, the current conveying speed detected by the detection unit, and one of the predetermined first target conveying speed and a speed based on the target position of the recording medium, are input and that calculates a speed error; and a speed controller controlling the driving unit based on the speed error calculated by the second calculation unit.

2. The apparatus as claimed in claim 1, wherein the position controller includes a subtracting unit calculating a speed error indicating a difference between the first target conveying speed and the current conveying speed;

an integrating-and-state-quantity-correcting unit integrating the speed error to obtain an integral and adding the correction value to the integral to calculate a positional deviation; and a position control unit calculating the second target conveying speed based on the positional deviation.

3. The apparatus as claimed in claim 2, wherein the integrating-and-state-quantity-correcting unit calculates the positional deviation by repeatedly adding a small correction value, which is a division of the correction value, at a predetermined interval to the integral until a total added value reaches the correction value.

4. The apparatus as claimed in claim 2, wherein the integrating-and-state-quantity-correcting unit outputs the correction value as the positional deviation to the position control unit.

5. The apparatus as claimed in claim 1, wherein the position controller includes a subtracting unit calculating a speed error indicating a difference between the first target conveying speed and the current conveying speed;

an integrating unit integrating the speed error to calculate a positional deviation;

an adding unit adding the correction value to the positional deviation to calculate a corrected positional deviation; and a position control unit calculating the second target conveying speed based on the corrected positional deviation.

6. The apparatus as claimed in claim 5, wherein the adding unit calculates the corrected positional deviation by repeatedly adding a small correction value, which is a division of the correction value, at a predetermined interval to the positional deviation until a total added value reaches the correction value.

7. The apparatus as claimed in claim 1, further comprising:

a differentiating unit differentiating the target position to obtain the first target conveying speed, wherein the position controller includes an integrating unit integrating the current conveying speed to obtain a current position of the recording medium;

an adding unit adding the correction value to the target position to calculate a corrected target position of the recording medium;

a subtracting unit calculating a positional deviation indicating a difference between the corrected target position and the current position of the recording medium; and a position control unit calculating the second target conveying speed based on the positional deviation, wherein the speed controller controls the driving unit based on the second target conveying speed, the current conveying speed, and the first target conveying speed obtained by the differentiating unit.

8. The apparatus as claimed in claim 7, wherein the adding unit calculates the corrected target position by repeatedly adding a small correction value, which is a division of the correction value, at a predetermined interval to the target position until a total added value reaches the correction value.

9. The apparatus as claimed in claim 1, further comprising:

a differentiating unit differentiating the target position to obtain the first target conveying speed, wherein the position controller includes an integrating unit integrating the current conveying speed to obtain a current position of the recording medium;

a positional deviation detection unit calculating a positional deviation indicating a difference between the target position and the current position of the recording medium and calculating a corrected positional deviation by adding the correction value to the positional deviation; and a position control unit calculating the second target conveying speed based on the corrected positional deviation, wherein the speed controller controls the driving unit based on the second target conveying speed, the current conveying speed, and the first target conveying speed obtained by the differentiating unit.

10. The apparatus as claimed in claim 9, wherein the positional deviation detection unit calculates the corrected positional deviation by repeatedly adding a small correction value, which is a division of the correction value, at a predetermined interval to the positional deviation until a total added value reaches the correction value.

11. The apparatus as claimed in claim 9, wherein the positional deviation detection unit outputs the correction value as the corrected positional deviation to the position control unit.

12. The apparatus as claimed in claim 1, further comprising:

a limiting unit allowing only the second target conveying speed that is within a predetermined range to pass through.

13. The apparatus as claimed in claim 1, further comprising:

a switching unit preventing the second target conveying speed from being input to the speed controller and thereby causing the speed controller to control the driving unit based on the current conveying speed and the first target conveying speed.

14. The apparatus as claimed in claim 1, further comprising:

a correcting unit correcting, after a predetermined number of image forming processes or a predetermined period of time, the first target conveying speed of the conveying unit or the target position of the recording medium.

15. A method of forming an image on a recording medium by an image forming apparatus that includes a conveying unit conveying the recording medium and a driving unit driving the conveying unit, the method comprising the steps of:

calculating a correction value based on a position error of the recording medium with respect to the image;

detecting a current conveying speed of the recording medium being conveyed by the conveying unit;

inputting the detected current conveying speed, one of a predetermined first target conveying speed and a target position of the recording medium and the calculated correction value and outputting a second target conveying speed;

inputting a value based on the second target conveying speed, the detected current conveying speed and one of the predetermined first target conveying speed and a speed based on the target position of the recording medium and calculating a speed error; and controlling the driving unit based on the calculated speed error.

16. A non-transient computer-readable storage medium having program code stored therein for causing a computer to perform the method of claim 15.

* * * * *